April 5, 1932. J. M. HALL 1,852,010
SHOCK ABSORBER
Filed April 11, 1923 3 Sheets-Sheet 1

Joseph M. Hall, Inventor

April 5, 1932.   J. M. HALL   1,852,010
SHOCK ABSORBER
Filed April 11, 1923    3 Sheets-Sheet 2
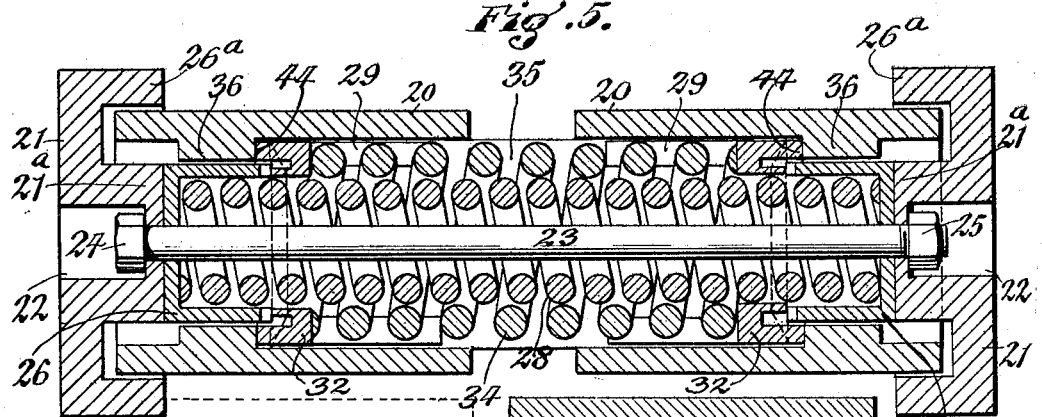
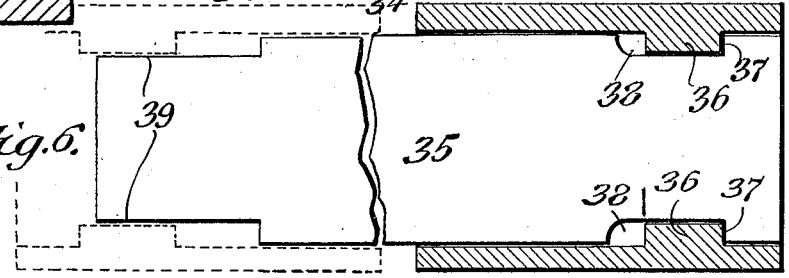
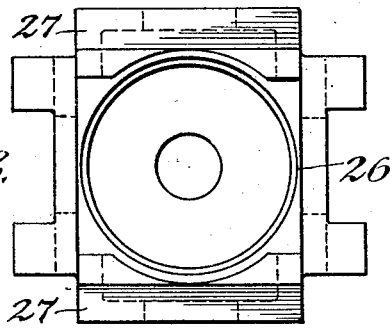
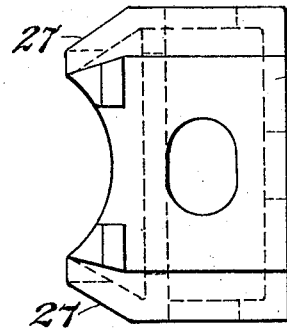
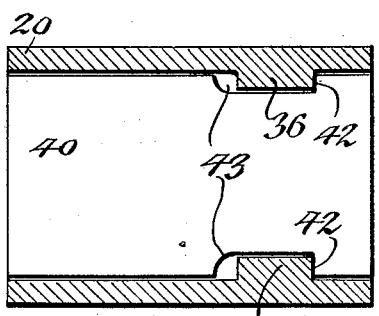

April 5, 1932.  J. M. HALL  1,852,010
SHOCK ABSORBER
Filed April 11, 1923   3 Sheets-Sheet 3
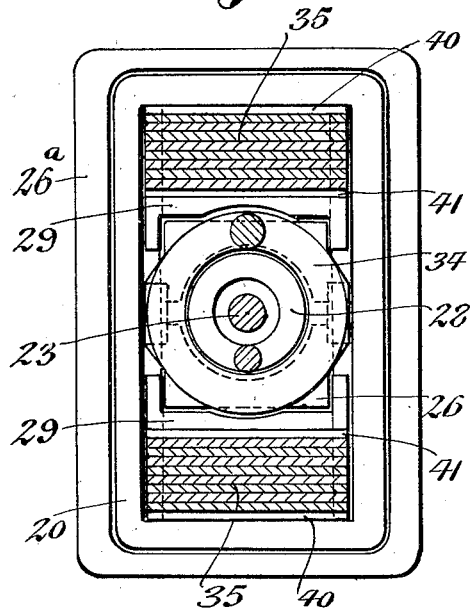
Fig.10.
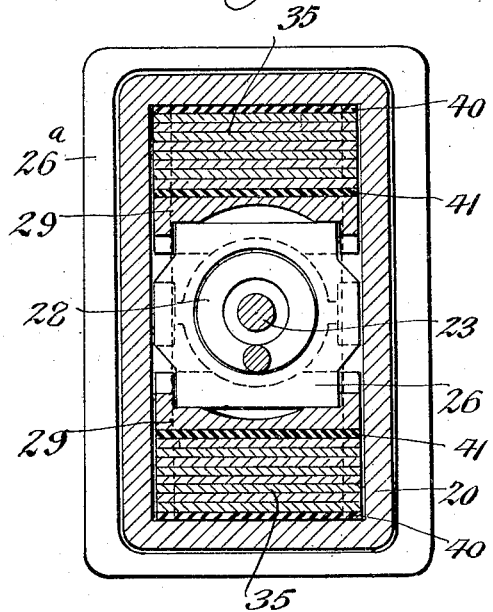
Fig.11.
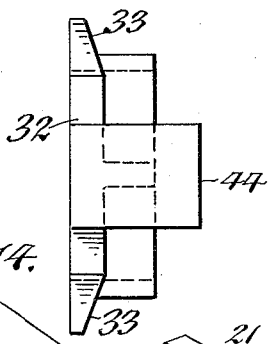
Fig.12.
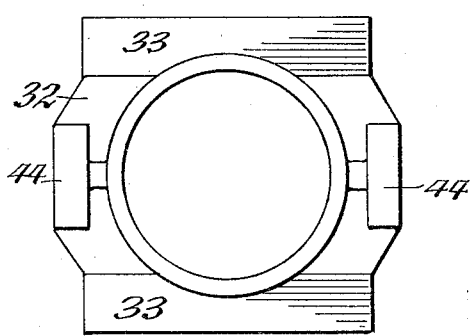
Fig.13.
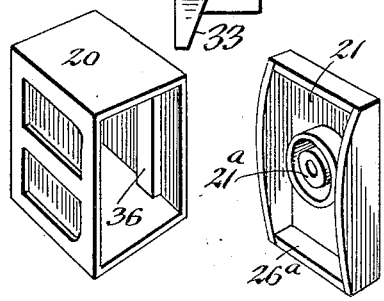
Fig.14.
Fig.15.
Inventor:
Joseph M. Hall
by Geyer & Popp
Attys.

Patented Apr. 5, 1932

1,852,010

UNITED STATES PATENT OFFICE

JOSEPH M. HALL, OF HAMILTON, ONTARIO, CANADA, ASSIGNOR TO UNIVERSAL DRAFT GEAR ATTACHMENT CO., A CORPORATION OF ILLINOIS

SHOCK ABSORBER

Application filed April 11, 1923. Serial No. 631,323.

This invention relates to a shock absorber of the friction type which is more particularly designed for use on a draft gear in railway practice for cushioning the shock on the cars when subjected to pulling or pushing loads.

One of the objects of this invention is to provide means for preventing undue wear on the housings and wedge plates or shoes of the shock absorber and permit of renewing the wearing parts cheaply and easily.

Another object of this invention is to simplify the construction of the housings by making the heads and barrels of the same separate and thus enable the wedge to move backwardly with greater freedom inasmuch as the barrels of the housings do not slide on the friction plates.

Other objects of this invention are to provide improvements in the details of construction as will presently appear.

Figure 1:
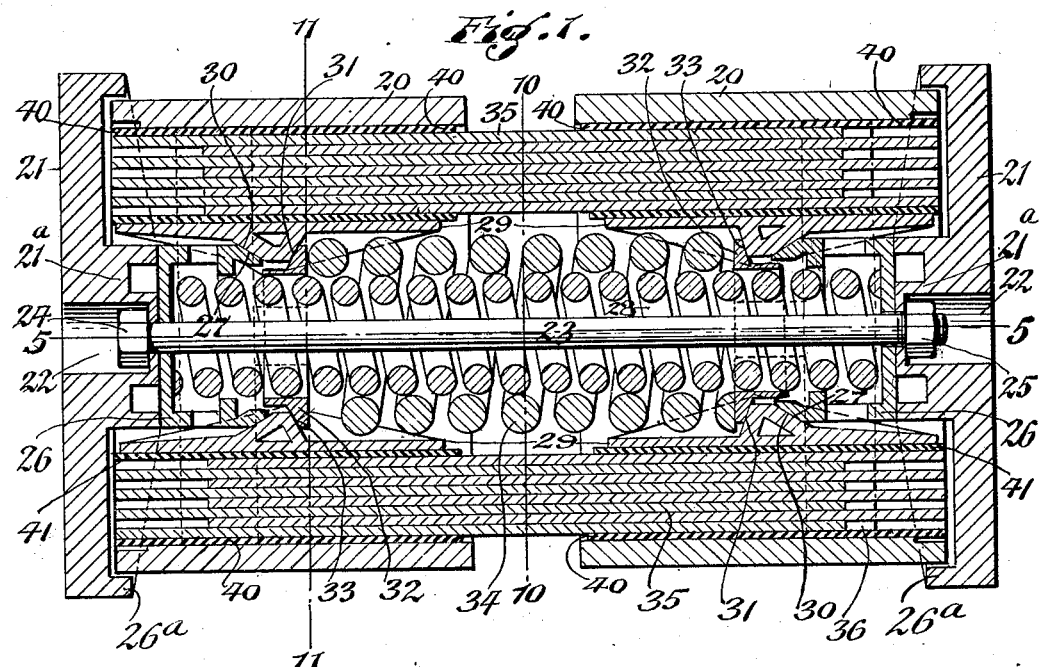
Figure 2:
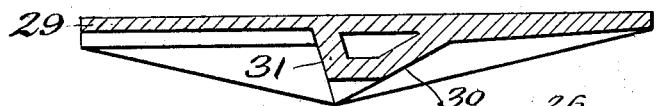
Figures 3, 4:
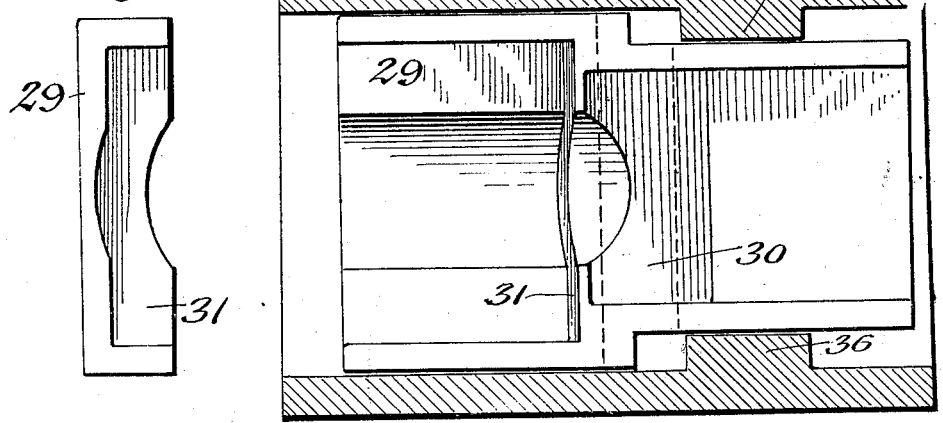

In the accompanying drawings:

Figure 1 is a vertical longitudinal section of a shock absorber embodying my invention and showing the same in release position. Figure 2 is a longitudinal section of one of the wedge plates or friction shoes, on an enlarged scale. Figure 3 is an end view thereof. Figure 4 is a longitudinal sectional elevation of one of the wedge plates and the adjacent housing barrel. Figure 5 is a longitudinal section taken on line 5—5, Fig. 1. Figure 6 is a similar view showing the relation of one of the friction plates to one of the housing barrels. Figure 7 is a similar view showing the relation of one of the wear plates to one of the housing barrels. Figure 8 is a front elevation of one of the wedge blocks. Figure 9 is a side elevation of the same. Figures 10 and 11 are vertical transverse sections taken on the correspondingly numbered lines in Fig. 1. Figure 12 is a side elevation of one of the spring seats. Figure 13 is a rear elevation of the same. Figures 14 and 15 are perspective views of one of the housing barrels and housing heads, respectively.

Similar characters of reference refer to like parts throughout the several views.

In its general organization this shock absorber or friction draft gear comprises two housings which are movable lengthwise relatively to each other, wedge plates arranged within the housings, intercalated friction plates arranged lengthwise between the wedge plates and the housings, and spring means which resist the closing movement of the gears and operate to release the same and also to co-operate with the wedge plates for producing a lateral pressure of the friction plates against each other. As shown in the drawings, each of the housings comprises a barrel shaped body 20 which is preferably rectangular in cross section, and a head 21 arranged across the outer end of the respective barrel, but made separate therefrom so that these parts are movable independently of each other in a direction lengthwise of the gear. On its central part each of the housing heads is provided with an integral projecting boss 21$^a$, the outer side of which is recessed, as shown at 22. When the gear is removed from the car or other vehicle on which the same is mounted, these two housings are prevented from spreading unduly and held in their properly assembled position by means of a spacing rod 23 which extends lengthwise through the gear at the axis thereof and through the central opening on the boss 21$^a$ of the housing heads and is provided at one end with a head 24 which bears against the bottom of the recess 22 in one of the housing heads, while a screw nut 25 at the opposite end thereof bears against the bottom of the recess 22 and the bottom of the boss on the other housing head, as shown in Figs. 1 and 5. In the preferred construction each of the housing heads is provided with an inwardly projecting marginal flange 26$^a$ which overhangs the adjacent outer end of the companion barrel 20, so as to reduce to a minimum the entrance of dirt into the gear at this point.

Adjacent to the inner side of each of the housing heads is arranged a wedge block 26 which bears at its outer side against the inner end of the boss on the respective housing head and is provided on opposite sides of its inner end with wedge faces 27. These wedge blocks are held in engagement with the housing heads and the latter are yieldingly held apart to the fullest extent permitted by the nut and head of the distance rod 23 by means of a releasing spring 28 arranged lengthwise in the gear and surrounding the distance rod 23 and bearing at its opposite ends against the inner sides of the wedge blocks 26. On opposite sides of each of the wedge blocks is arranged a pair of friction plates or shoes 29, each of which has a longitudinal flat face on its laterally outer side while its longitudinal inner side is provided with an outwardly inclined wedge face 30 which bears against one of the inclined faces 27 of the wedge block and also provided with an inwardly inclined wedge face 31. Surrounding those parts of the releasing spring which are arranged between the two pairs of wedge plates are two annular spring seats 32, each of which is provided on its diametrically opposite sides with outwardly inclined faces 33 which engage with the inclines 31 on the respective wedge plates. Surrounding the central part of the releasing spring is a friction spring 34 which bears at its opposite ends against the inner sides of the spring seats 32.

On opposite sides of the longitudinal axis of the shock absorber or friction draft gear are arranged two sets of longitudinal friction plates 35, the members of each group being composed of two groups which are intercalated and the members of each group being operatively associated with one of said housings, so as to move lengthwise therewith part of the time, but permit the respective housings to move independently of the plates at other times.

The friction plates of each group are caused to move inwardly by engagement of the outer ends of the same with the inner side of the head of the respective housing, and an outward movement of these plates with the barrel or body of the corresponding housing is effected by means of releasing bars or ribs 36, two of which are preferably arranged on opposite inner sides of the housing barrel respectively, and preferably formed integrally therewith and each of these bars engaging with an inwardly facing shoulder 37 formed at the outer extremity or notch 38 in the longitudinal edge portion of the respective friction plate. The inner end of each friction plate is disconnected from and free to slide relatively to the barrel or body of the other housing and is reduced in width, as shown at 39 in Fig. 6, so as to clear the releasing bars 36 on the other housing barrel, as best shown in Fig. 6.

Interposed between the outer longitudinal sides of the two sets of friction plates and adjacent flat inner sides of the housing barrels are two wearing plates 40, and between the inner longitudinal sides of the two sets of friction plates and the outer longitudinal faces of the wedge plates, are two inner wearing plates 41. Each of these wearing plates is moved longitudinally inward in unison with the respective groove of the friction plates by engagement of the outer end of this wearing plate with the inner side of the adjacent housing head and its longitudinal outward movement with the adjacent housing barrel is effected by engagement of the respective releasing bars or ribs 36 with inwardly facing shoulders 42 formed at the outer ends of the recesses 43 at the longitudinal edges of this wearing plate, as best shown in Fig. 7.

In Figs. 1 and 5 the parts are in the position which they occupy when the shock absorber or friction draft gear is in its released or open position.

By moving the head of the housing at one end of the gear longitudinally inward toward the other housing, the initial part of this movement is effected independently of the respective barrel and the friction plates. At this time the wedge block of the respective housing moves inwardly therewith, thereby increasing the tension upon the releasing spring 28 and also causing the wedge surface 27 of the two wedge blocks, by engagement with the inclined surfaces 30 on the wedge plates, to force the latter radially or transversely outwardly, thereby causing the intercalated friction plates of the two sets to be pressed more forcibly against each other, these plates at this time being supported on their longitudinal outer sides by the barrels of the housings, which serve as abutments for this purpose and thereby increasing the frictional contact between the several friction plates. The longitudinally inward movement of the wedge plates or friction shoes at this time is resisted by the friction spring 34 which engages with the spring seats 32 and causes the co-operating inclined surfaces 33 and 31 between these spring seats and the wedge plates to assist in crowding the wedge shoes transversely outwardly for the purpose of increasing the frictional contact between the friction plates of the two sets with each other. This increased frictional contact between the several intercalated friction plates increases the frictional resistance against inward movement of the two groups of friction plates coupled with one of the housings relatively to the friction plates which are coupled with the other housing, and this frictional resistance increases in proportion to the increase in the inward movement of one housing relatively to the other housing, inasmuch as such an increased inward movement causes increased resistance of a friction spring 34 and also increases the wedging effect of the co-operating inclined surfaces in the several wedge plates and the wedge blocks and spring seats. Upon releasing the load on the shock absorber or friction draft gear, the first effect is to start the separation of the two housing heads from each other by the resilience of the releasing spring 28 which relieves the outward pressure of the wedge blocks against the wedge plates and also the outward wedging pressure of the spring seats against the wedge plates under the action of the friction springs 34. The outward movement of the housing heads is effected independently of the barrels of the housings and the friction plates and wearing plates by causing a gap between the inner sides of the housing heads and the outer ends of the housing barrels, friction plates and wearing plates. After the housing heads have effected this initial longitudinal outward movement and the lateral pressure against the friction plates has been reduced, it is possible for the two groups of friction plates of one housing barrel to be moved longitudinally outwardly relatively to the other pair or group of friction plates associated with the other housing barrel, for the purpose of opening the gear. This outward or releasing movement of these parts is effected by the expansion of the friction spring, the effect of which is transmitted from the spring seats to the releasing bars or ribs on the housing barrels by means of releasing lugs 44 mounted on opposite sides of the friction spring seats and engaging on the inner sides of the releasing bars or ribs 36, as shown in Fig. 5, which bars in turn bear against the inwardly facing shoulders 37 of the respective friction plates, as shown in Fig. 6 and the inwardly facing shoulders 42 of the wearing plates, as shown in Fig. 7, so that the two housing barrels are moved lengthwise apart from each other together with the respective friction plates connected therewith.

By making the heads and barrels of each housing separate from each other in this manner, it is possible for the wedge plates to move back with more freedom, in order to relieve the wedging pressure because the barrels of the housings do not have to slide on the outermost friction plates for this purpose. Furthermore, this arrangement also renders it possible to simplify the construction of the gear and reduce the cost of casting the housing.

By employing separate wearing plates between the friction plates and the housing barrels and wedge plates of friction shoes, the wearing action of the housings and wedge plates is reduced and at the same time a construction is obtained which is cheap, which permits of easily removing the wearing surface and it also permits of using materials in the wearing plates which have a high resistance to wear. Moreover, by providing wearing plates which take the wear in place of the housing barrels and wedge plates a considerable economy is effected, inasmuch as this permits the housing and wedge plates to be used indefinitely and thus effect a considerable economy in maintenance of the gear.

I claim as my invention:

1. A friction shock absorber comprising a plurality of sets of friction plates, the inner or front parts of one set being intercalated with the front parts of another set, wear plates engaging with the laterally outer flat sides of said friction plates adjacent to the opposite ends thereof, open ended bodies which surround the outer end portions of said friction plates and are engaged by said wear plates, longitudinal pressure-transmitting and lateral-pressure creating means co-operable with said friction plates and wearing plates, a spring resistance, and means for causing said sets of friction plates, wear plates and bodies to move lengthwise relatively to each other and to restore the parts to normal position.

2. A friction shock absorber comprising a plurality of sets of friction plates, the inner or front parts of one set being intercalated with the corresponding parts of another set, wear plates engaging with the laterally inner flat sides of said friction plates adjacent to the opposite ends thereof, open ended bodies which surround the outer end portions of said sets of friction plates, centrally disposed pressure-transmitting and lateral-pressure creating means co-operable with said wear plates, a spring resistance, and means for moving said sets of friction plates, wear plates and bodies lengthwise relatively to each other.

3. A friction shock absorber comprising a plurality of sets of friction plates, the inner or front parts of one set being intercalated with the corresponding parts of another set, inner wear plates engaging with the laterally inner flat sides of said friction plates adjacent to the opposite ends thereof, outer wear plates engaging with the laterally outer flat sides of said friction plates adjacent to the ends thereof, open ended bodies which surround the outer end portions of said friction plates and are engaged by said outer wear plates, wedge shoes engaging said inner wear plates, a longitudinally movable wedge block engaging said wedge shoes, a spring resistance, and separate followers or heads adapted to engage the outer ends of said bodies, friction plates, wear plates and wedge block.

4. A friction shock absorber comprising a plurality of sets of friction plates, the inner or front parts of one set being intercalated with the corresponding parts of another set, inner wear plates engaging with the laterally inner flat sides of said friction plates adjacent to the opposite ends thereof, outer wear plates engaging with the laterally outer flat sides of said friction plates adjacent to the ends thereof, open ended bodies which surround the outer end portions of said friction plates and are engaged by said outer wear plates, wedge shoes engaging said inner wear plates, a longitudinally movable wedge block engaging said wedge shoes, a spring resistance, and separate followers or heads adapted to engage the outer ends of said bodies, friction plates, wear plates and wedge shoes, said bodies being provided on their inner sides with coupling ribs and the edges of said wearing plates and friction plates being provided with notches which receive said coupling ribs.

5. A friction shock absorber comprising a plurality of sets of friction plates, the plates of one set being intercalated with the plates of the other set, a plurality of containers each having a tubular body surrounding one end of said sets of plates and a head or follower capable of moving lengthwise independently of the tubular body and the adjacent plates and also adapted to engage the outer ends of the respective body and plates, pressure-transmitting and lateral-pressure creating means co-operable with said intercalated plates, a spring resistance, each of said sets of friction plates being coupled with one of said bodies and with said spring resistance for causing said bodies and plates to move rearwardly or outwardly upon release of the shock absorber.

6. In a friction shock absorbing mechanism, the combination with front and rear followers relatively movable toward each other; of front and rear friction casings, relatively movable toward each other and normally spaced slightly from the front and rear followers respectively and adapted to be moved by said followers; a plurality of friction plates anchored to each casting, the plates anchored to the respective casings extending toward each other and being intercalated; a wedge-pressure-creating means co-acting with said followers and plates; and a spring resistance co-acting with said means.

7. In a friction shock absorbing mechanism, the combination with front and rear followers, relatively movable toward and from each other; of front and rear friction casings also relatively movable toward and away from each other, said casings being adapted to be moved by said followers, each casing and the corresponding follower being arranged for slight relative movement during initial action of the mechanism; two laterally separated groups of friction plates cooperating with said friction casings, each group comprising two sets of plates, one of said sets being movable with each casing; spreading means disposed between said groups of plates directly actuated by each follower independently of said friction casings; and a main spring resistance.

8. In a friction shock absorbing mechanism, the combination with front and rear followers relatively movable toward and from each other; of front and rear friction casings also relatively movable toward and from each other, said casings having interior, opposite, longitudinally disposed friction surfaces; a plurality of relatively movable friction plates within said casings and adapted to be engaged by said casings to effect relative movement thereof, said plates being divided into two groups disposed on opposite sides of the mechanism, each group coacting with the friction surfaces at one side of said casings; a lateral wedge pressure creating system at each end of the mechanism disposed between said groups of plates, each system including a wedge pressure transmitting element and a plurality of wedge friction shoes; front and rear spring followers; a main spring resistance interposed between said followers; a second spring resistance interposed between said wedge pressure transmitting elements; and means coacting directly with the spring follower for restoring the friction elements to normal position.

9. In a friction shock absorbing mechanism, the combination with front and rear followers relatively movable toward and from each other; of front and rear friction casings also relatively movable toward and from each other, said casings having interior, oppositely disposed friction surfaces; a plurality of relatively movable, intercalated friction plates within said casings adapted to be moved relatively to each other by said followers upon compression of said mechanism, said plates being divided into two groups disposed at opposite sides of the mechanism; a wedge pressure transmitting member at each end of the mechanism; a friction shoe interposed between each wedge and a corresponding group of friction plates; front and rear spring followers coacting with said friction shoes; a main spring resistance interposed between the spring followers; and means directly coacting with said spring followers for restoring the friction plates to normal position upon release of said mechanism, said plates engaging the casings to restore the latter to normal position also.

10. In a friction shock absorbing mechanism, the combination with follower acting means; of a plurality of relatively movable, intercalated friction plates, said plates being moved relatively to each other upon relative movement of said followers, said plates being divided into two groups disposed on opposite sides of the mechanism; a lateral pressure resisting member coacting with said groups of plates; spreading means for placing said group of plates under lateral pressure, said last named means including a wedge pressure transmitting member and friction shoes; a main spring resistance; a spring follower interposed between said shoes and said main spring resistance; additional spring resistance means independent of said main spring resistance directly coacting with said wedge member; and means directly coacting with said spring follower for restoring the friction plates to normal position.

11. In a friction shock absorbing mechanism, the combination with front and rear followers relatively movable toward each other; of front and rear friction casings, relatively movable toward each other and normally spaced slightly from the front and rear followers respectively and adapted to be moved by said followers; a plurality of friction plates movable with each casing, the plates movable with the respective casings extending toward each other and being intercalated; a wedge pressure creating means co-acting with said followers and plates; and a spring resistance co-acting with said means.

12. In a friction draft gear, the combination with front and rear followers relatively movable toward each other, of front and rear friction casings relatively movable toward each other and movable relative to said followers, and normally spaced slightly from the front and rear followers respectively, and adapted to be moved by said followers during the compression of the gear after the initial compressive movement thereof, a plurality of intercalated friction plates within said casings movable relative to said followers and adapted to be moved by said followers during the final compression of said mechanism, wedge pressure creating means at each end of said gear coacting with said followers and plates, and means comprising resilient members for resisting the compression of said gear and for returning the parts to normal position after release.

JOSEPH M. HALL.